United States Patent
Zettier

[11] Patent Number: 5,591,469
[45] Date of Patent: Jan. 7, 1997

[54] PROCESS AND SYSTEM FOR REGULATING THE FAT CONTENT OF MILK AND CREAM

[75] Inventor: Karl-Heinz Zettier, Oelde, Germany

[73] Assignee: Westfalia Separator Aktiengesellschaft, Oelde, Germany

[21] Appl. No.: 495,529
[22] PCT Filed: Nov. 11, 1993
[86] PCT No.: PCT/EP93/03162
§ 371 Date: Jul. 10, 1995
§ 102(e) Date: Jul. 10, 1995
[87] PCT Pub. No.: WO94/16571
PCT Pub. Date: Aug. 4, 1994

[30] Foreign Application Priority Data

Jan. 27, 1993 [DE] Germany .......... 43 02 165.4

[51] Int. Cl.⁶ .......... A23C 9/00; G01N 33/00
[52] U.S. Cl. .......... 426/231; 99/452; 99/456; 426/491
[58] Field of Search .......... 426/231, 491, 426/586; 99/452, 456; 210/96.1, 745

[56] References Cited

U.S. PATENT DOCUMENTS 4,075,355  2/1978  Pato .......... 426/231

Primary Examiner—George Yeung
Attorney, Agent, or Firm—Sprung Horn Kramer & Woods

[57] ABSTRACT

A process and system for controlling fat content in standardized milk and standardized cream. Whole milk is separated in a centrifuge into high-fat cream and low-fat milk. The high-fat cream leaving the centrifuge and the non-fat milk leaving the centrifuge are controlled to maintain the compositions of each constant. A portion of the high-fat cream is added to a portion of the non-fat milk to produce standardized milk and a portion of the non-fat milk is added to a portion of the high-fat cream to produce standardized cream. The fat content of the standardized cream is regulated by controlling the amount of the non-fat milk added to the high-fat cream.

4 Claims, 1 Drawing Sheet

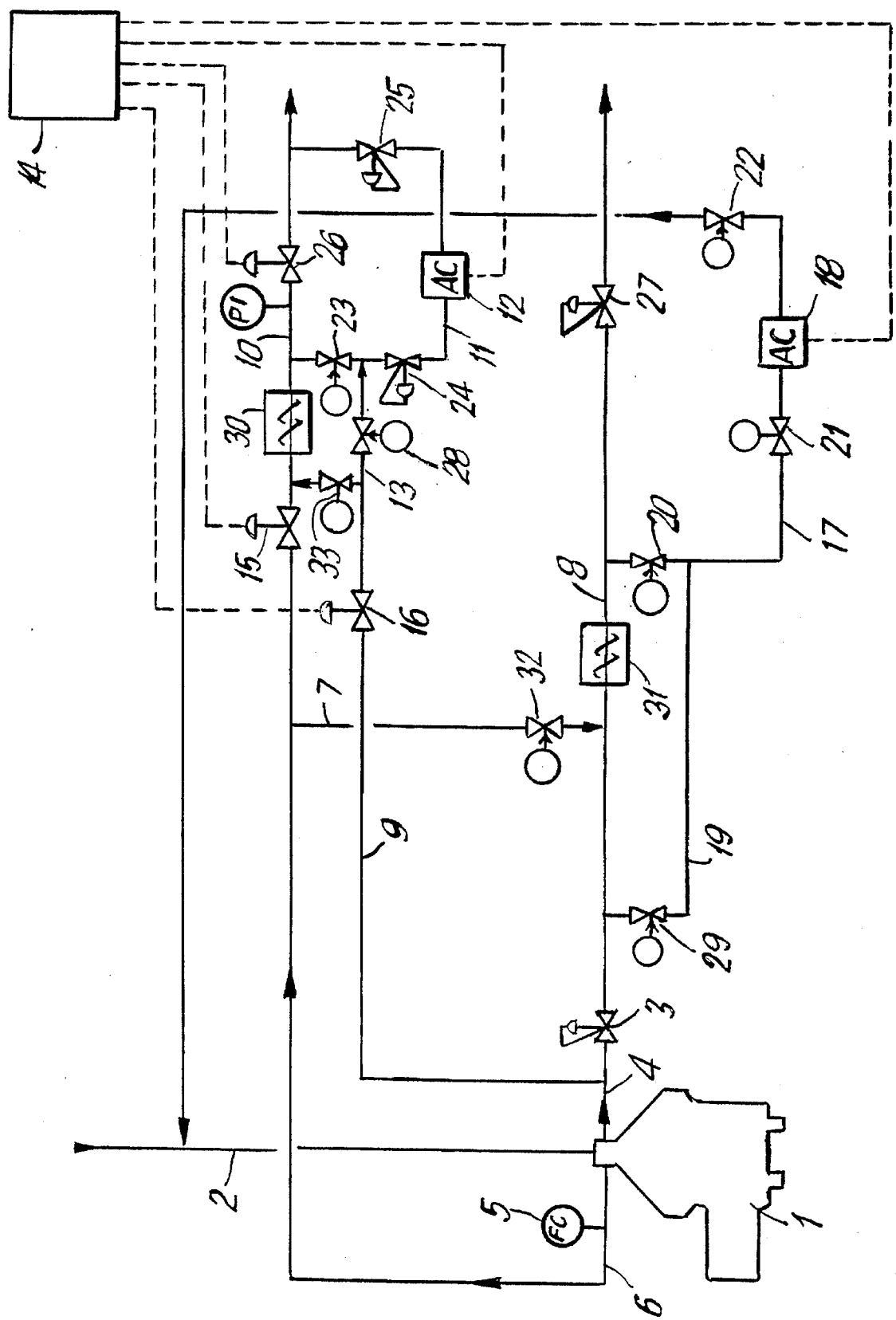

PROCESS AND SYSTEM FOR REGULATING THE FAT CONTENT OF MILK AND CREAM

BACKGROUND OF THE INVENTION

The present invention concerns a procedure for regulating the fat content of milk and cream. A centrifuge separates whole milk into high-fat cream and non-fat milk. Controls maintain the composition of the high-fat cream leaving the centrifuge constant. Other controls add high-fat cream to the non-fat milk to make standardized milk and non-fat milk to the high-fat cream to make standardized cream.

A similar procedure is known from Austrian Patent 378 103. Some of the standardized milk is added to the cream to adjust its fat content. Standardized milk must still often be produced with different fat contents. Resetting the machinery for a different fat content engages appropriate controls in the standardized-milk sequence. Since the fat content of the standardized milk added to the cream also changes, the controls that regulate that portion must also be active to ensure that the fat content of the cream remains constant. This interaction on the part of the controls eventually leads to instable regulation and accordingly to variations in the fat contents in both portions.

SUMMARY OF THE INVENTION

A procedure is known from French A 2 316 650 wherein cream is standardized by adding already standardized milk to it as it leaves the centrifuge. The aforesaid drawbacks, however, occur in this approach.

WIPO A 9 000 862 discloses standardizing milk by mixing the non-fat milk leaving a centrifuge with already standardized cream. In this approach, however, changing the fat content of the standardized cream immediately affects the previously established fat content of the standardized milk.

The object of the present invention is a procedure wherein the controls do not interact.

This object is attained in accordance with the present invention in that controls maintain the composition of the non-fat milk leaving the centrifuge constant, and non-fat milk is added to the cream to regulate its fat content.

Since the composition of the non-fat milk is maintained constant, any variation in the fat content of the standardized milk will not affect the fat content of the standardized cream. The controls that regulate the standardized cream accordingly do not relate to any change in the fat content of the standardized milk.

The density of the non-fat milk and that of the standardized cream are measured at intervals in one and the same instrument in one embodiment of the present invention. The result obtained at each interval is compared with a stored value. When there is a discrepancy, the stored value is replaced with the last result obtained.

The incoming portion of non-fat milk is subsequently treated until the difference between the density of the non-fat milk and that of the standardized cream corresponding to that discrepancy equals the desired fat content of the standardized cream. A constant difference between the density of the non-fat milk and that of the standardized cream is accordingly not employed as a parameter, and it is determined anew at each interval whether or not the difference still corresponds to the previously measured density of the non-fat milk. If not, a processor undertakes appropriate corrections. This procedure considerably increases the level of precision desirable for adjusting the fat content of the standardized cream.

Advantageous embodiments of equipment for carrying out the aforesaid procedure will be evident from the remaining subsidiary claims.

BRIEF DESCRIPTION OF THE DRAWING

One embodiment of the present invention is illustrated in the drawing and will now be specified.

DETAILED DESCRIPTION OF THE INVENTION

A centrifuge 1 has an intake line 2 for whole milk, an outlet line 4 that conveys non-fat milk, and an outlet line 6 that conveys high-fat cream. Non-fat milk outlet line 4 accommodates pressure controls 3. High-fat cream outlet line 6 accommodates flow controls 5. A line 7 that blends high-fat cream with non-fat milk connects high-fat cream outlet line 6 to non-fat milk outlet line 4. A line 8 that conveys standardized milk extends from where cream-and-milk blending line 7 meets non-fat milk outlet line 4. Another line 9 that blends high-fat cream with non-fat milk diverges from non-fat milk outlet line 4 and communicates along with high-fat cream outlet line 6 with a line 10 that conveys standardized cream. A bypass 11 diverges from standardized-cream line 10. Bypass 11 accommodates a fat-content detector 12. Bypass 11 communicates with second cream-and-milk blending line 9 by way of a line 13. Fat-content detector 12 communicates with controls 14. Controls 14 in turn communicate with a valve 15 in high-fat cream outlet line 6 and with another valve 16 in second blending line 9. A recirculation line 17 extends from standardized-milk line 8 to whole-milk intake line 2. Recirculation line 17 accommodates another fat-content detector 18. Recirculation line 17 communicates with non-fat milk outlet line 4 by way of a line 19. The flow through the various lines can be controlled by valves 20, 29, and 33.

Whole milk is supplied to centrifuge I through intake line 2 and separated into non-fat milk and high-fat cream. The composition of the non-fat milk and that of the high-fat cream are maintained constant by pressure controls 3 and flow controls 5.

Controls 14 and valve 15 initially regulate the fat content of the standardized milk by adjusting the volume of high-fat cream supplied to non-fat milk outlet line 4 by way of first blending line 7. The controls operate conventionally as will now be specified with particular reference to the cream. The standardized-milk portion is always adjusted whenever its fat content changes, and regulation of the standardized cream is suppressed by controls 14 during that phase. Interactions are accordingly avoided by instantaneous changes in flow.

How the fat content of the cream is regulated will now be specified. Controls 14 close valve 23 and open valve 28. Some non-fat milk enters bypass 11 through second blending line 9 and connecting line 13. The density of the non-fat milk is detected by fat-content detector 12. The result is stored in controls 14 and a difference associated with it. Controls 14 open valve 23 and close valve 28.

Controls 14 and valve 16 add non-fat milk to the high-fat cream in second blending line 9 until the density of the standardized cream in line 10, which is monitored by fat-content detector 12, equals the aforesaid difference. This setting is retained for a prescribed interval until a new fat content is detected and valves 23 and 28 and controls 14 alter the route.

If the density of the non-fat milk has not changed, the stored value will be retained as a basis for setting valve 16. When on the other hand a deviation from the previously detected density of the non-fat milk is detected, the new value is stored and a new difference associated with it. Controls 14 will adjust valve 16 to establish the new difference.

Since the fat content of the standardized cream is regulated by the addition of non-fat milk that retains a constant composition even when the standardized milk is subject to treatment downstream, the two processes do not affect each other. The result is very rapid regulation.

The non-fat milk is thoroughly blended with the cream supplied through first cream-and-milk blending line 7 and the high-fat cream with the non-fat milk supplied through second cream-and-milk blending line 9 in blenders 30 and 31.

I claim:

1. A process for controlling fat content in standardized milk and standardized cream, comprising the steps of:

separating whole milk in a centrifuge into high-fat cream and non-fat milk;

controlling the high-fat cream leaving the centrifuge to maintain the composition thereof constant;

controlling the non-fat milk leaving the centrifuge to maintain the composition thereof constant;

adding a first portion of the constant composition high-fat cream to a first portion of the constant composition non-fat milk to produce standardized milk;

adding a second portion of the constant composition non-fat milk to a second portion of the constant composition high-fat cream to produce standardized cream; and regulating the fat content of the standardized cream by controlling the amount of the second portion of the constant composition non-fat milk added to the second portion of the constant composition high-fat cream.

2. The process according to claim 1, wherein the step of regulating comprises measuring the density of the second portion of the constant composition non-fat milk and the density of the standardized cream at a plurality of time intervals, comparing a result obtained at each interval with a stored value to determine if there is a difference, replacing the stored value with the result obtained at the last interval when there is a difference, and controlling the amount of the non-fat milk added to the high-fat cream based on the difference to obtain a desired fat content for the standardized cream.

3. A system for controlling fat content in standardized milk and standardized cream, comprising:

a centrifuge for separating whole milk into high-fat cream and non-fat milk;

a controller for maintaining the composition of the high-fat cream leaving the centrifuge constant and for maintaining the composition of the non-fat milk leaving the centrifuge constant;

a line for adding a first portion of the constant composition high-fat cream to a first portion of the constant composition non-fat milk to produce standardized milk;

a line for adding a second portion of the constant composition non-fat milk to a second portion of the constant composition high-fat cream to produce standardized cream; and a valve for controlling the amount of the second portion of the constant composition non-fat milk added to the second portion of the constant composition high-fat cream to regulate the fat content of the standardized cream.

4. The system according to claim 3, further comprising a single instrument for measuring the density of the second portion of the constant composition non-fat milk and the density of the standardized cream at a plurality of time intervals, wherein the controller compares a result obtained at each interval with a stored value to determine if there is a difference and replacing the stored value with the result obtained at the last interval when there is a difference and controls the amount of the non-fat milk added to the high-fat cream in based on the difference to obtain a desired fat content for the standardized cream.

* * * * *